(12) United States Patent
Fu et al.

(10) Patent No.: US 10,516,257 B2
(45) Date of Patent: Dec. 24, 2019

(54) VOLTAGE SOURCE CONVERTER BASED DIRECT CURRENT DEICER AND CONTROLLING METHOD THEREOF

(71) Applicant: CHINA SOUTHERN POWER GRID TECHNOLOGY RESEARCH INSTITUTE CO., LTD, Guangzhou, Guangdong (CN)

(72) Inventors: Chuang Fu, Guangdong (CN); Hong Rao, Guangdong (CN); Juanjuan Wang, Guangdong (CN); Shukai Xu, Guangdong (CN)

(73) Assignee: CHINA SOUTHERN POWER GRID TECHNOLOGY RESEARCH INSTITUTE CO., LTD., Guangzhou (CN)

( * ) Notice: Subject to any disclaimer, the term of this patent is extended or adjusted under 35 U.S.C. 154(b) by 1073 days.

(21) Appl. No.: 14/941,698

(22) Filed: Nov. 16, 2015

(65) Prior Publication Data

US 2016/0072267 A1 Mar. 10, 2016

Related U.S. Application Data

(63) Continuation-in-part of application No. PCT/CN2014/087160, filed on Sep. 23, 2014.

(30) Foreign Application Priority Data

Mar. 7, 2014 (CN) .......................... 2014 1 0083411

(51) Int. Cl.
*H02G 7/16* (2006.01)
*H05B 3/06* (2006.01)
(Continued)

(52) U.S. Cl.
CPC ............ *H02G 7/16* (2013.01); *H02M 7/5387* (2013.01); *H05B 3/0014* (2013.01); *H05B 3/0019* (2013.01); *H05B 3/06* (2013.01)

(58) Field of Classification Search
CPC .. H02M 1/088; H02M 1/32; H02M 2001/325; H02M 2007/4835;
(Continued)

(56) References Cited

U.S. PATENT DOCUMENTS

2012/0063181 A1* 3/2012 Chimento ............... H02M 1/32
363/56.03

FOREIGN PATENT DOCUMENTS

CN 102570369 A * 7/2011
CN 102570369 A 7/2012
(Continued)

OTHER PUBLICATIONS

International Search Report of PCT Patent Application No. PCT/CN2014/087160 dated Dec. 30, 2014.
(Continued)

*Primary Examiner* — Tu B Hoang
*Assistant Examiner* — Diallo I Duniver (57) ABSTRACT

A voltage source converter based DC deicer and its control method are provided. The voltage source converter based DC deicer includes a connecting reactor, a modular multi-level voltage source converter based on a full H-bridge submodule, smoothing reactors, deicing disconnectors, a deicing bus, and a deicing AC line. The AC side of the modular multilevel voltage source converter is connected to an AC side bus through the connecting reactor, an isolation disconnector and a breaker. The DC side of the modular multilevel voltage source converter is connected to the deicing AC line through the smoothing reactors, the deicing disconnectors, and the deicing bus.

2 Claims, 2 Drawing Sheets

(51) Int. Cl.
*H02M 7/5387* (2007.01)
*H05B 3/00* (2006.01)

(58) Field of Classification Search
CPC .............. H02M 7/5387; H05B 1/0227; H05B 2214/02; H05B 3/0014; H05B 3/06; H05B 3/0019; H05B 3/0028; H05B 1/0236; H05B 3/0042; H05B 2203/031; H05B 3/84; A63F 13/54; A63F 13/573; A63F 13/577; G06T 13/00; G06T 2207/30241; G06T 2210/21; G06T 7/20; G10K 15/02
USPC ........ 219/488, 670, 672, 494, 497, 499, 485
See application file for complete search history.

(56) References Cited

FOREIGN PATENT DOCUMENTS

| CN | 101877470 B | | 9/2012 |
|---|---|---|---|
| CN | 101882774 B | | 9/2012 |
| CN | 102739080 A | * | 10/2012 |
| CN | 103078287 A | * | 5/2013 |

OTHER PUBLICATIONS

Zhao et al., Overview of de-icing technology for transmission lines, Power System Protection and Control, Jul. 16, 2011, pp. 148-154, vol. 39, No. 14.
Li et al., Discussion on the Deicing Technology Using DC Current, Electric Power Equipment, Jun. 2008, pp. 20-24, vol. 9, No. 6.
Fan et al., Design and System Test of Movable DC De-icer for Jiangxi Power Grid, Automation of Electric Power Systems, Aug. 10, 2009, pp. 67-71, vol. 33, No. 15.
Liu et al., Research on Relocatable DC Ice-Melting Equipment Based on Switchable Device, Power System Technology, Mar. 2012, pp. 228-233, vol. 36, No. 3.
Jing et al., Research on a VSC-HVDC Converter Station With Ice-melting Function, Proceedings of the Chinese Society for Electrical Engineering, Jul. 5, 2012, pp. 65-73, vol. 32, No. 19.
Mei et al., A Novel DC Ice-melting Equipment Based on Modular Multilevel Cascade Converter, Automation of Electric Power Systems, Aug. 25, 2013, pp. 96-102, vol. 37, No. 16.

* cited by examiner

VOLTAGE SOURCE CONVERTER BASED DIRECT CURRENT DEICER AND CONTROLLING METHOD THEREOF

CROSS REFERENCE TO RELATED PATENT APPLICATION

This is a Continuation-In-Part Application of PCT Application No. PCT/CN2014/087160 filed on Sep. 23, 2014, which claims the benefit of Chinese Patent Application No. 201410083411.1 filed on Mar. 7, 2014, the entire content of which is hereby incorporated by reference.

FIELD OF THE INVENTION

The present invention relates to a voltage source converter based direct current (DC) deicer and controlling method thereof, which is an innovative technology applicable to the deicing of power transmission lines of a power grid. In particular, the voltage source converter (VSC) of the present invention is a modular multilevel voltage source converter based on a full H-bridge submodule.

BACKGROUND OF THE INVENTION

Ice disaster is one of the most serious threats to the electric power systems among all natural disasters. Compared to other natural disasters, ice disaster often causes more severe damages to the power grid, such as ice flashover, wire breakage, electric tower collapse, and even a failure in power grid.

Chinese patent Nos. 201010140060.5 and 201010140086.X respectively disclose a DC deicer with a dedicated rectifier transformer and a DC deicer without a dedicated rectifier transformer. However, both of said deicers adopt thyristors, which consumes much reactive power and generates characteristic harmonic component, thus bringing adverse influences on the AC system which is connected with the DC deicer. The DC deicer without the dedicated rectifier transformer disclosed by Chinese patent No. 201010140086.X can only adopt 6-pulse rectifier, which generates serious harmonic component during operation, so the load on the connection point need to be transferred to another bus.

Certain voltage source converter based DC deicers are described by Zhao et al., Power System Protection and Control, 2011, 39(14):148-154; Li et al., Electric Power Equipment, 2008, 9(6): 20-24; Fan et al., Automation of Electric Power Systems, 2009, 33(15): 67-71; Liu et al., Power System Technology, 2012, 36(3): 228-233; Jing et al., Proceedings of the Chinese Society for Electrical Engineering, 2012, 32(19):65-73; Mei et al., Automation of Electric Power Systems, 2013, 37(16): 96-102. However, all of these deicers could only be used for power transmission lines of 220 kV or a lower voltage level, in addition, these deicers could not meet the needs for boosting the current and voltage up from zero at the DC side of the DC deicer.

SUMMARY OF THE INVENTION

The purpose of the present invention is to provide a voltage source converter based DC deicer, which overcomes the disadvantages of the existing thyristor-based DC deicers.

The present invention also aims to provide a controlling method of the voltage source converter based DC deicer to meet the need of safe and fast deicing of all types of lines and ensure the quality of the AC system which is connected with the DC deicer.

The technical solution of the present invention is a voltage source converter based direct current (DC) deicer, comprising: a connecting reactor; a modular multilevel voltage source converter based on a full H-bridge submodule and having an alternating current (AC) side and a DC side; first and second smoothing reactors; first, second, third and fourth deicing disconnectors; a deicing bus having a phase-A, a phase-B and a phase-C; and a deicing AC line having a phase-A, a phase-B and a phase-C; wherein one end of the connecting reactor is connected to an AC side bus through an isolation disconnector and a breaker connected in series, and the other end of the connecting reactor is connected to the AC side of the converter; the DC side of the converter is connected to one end of each of the first and second smoothing reactors; the other end of the first smoothing reactor, one end of the first deicing disconnector and one end of the second deicing disconnector are connected to one another; the other end of the second smoothing reactor, one end of the third deicing disconnector and one end of the fourth deicing disconnector are connected to one another; the other end of the first deicing disconnector is connected with one end of the phase-A of the deicing bus; the other end of the second deicing disconnector, the other end of the third deicing disconnector and one end of the phase-B of the deicing bus are connected to one another; the other end of the fourth deicing disconnector is connected with one end of phase-C of the deicing bus; the other end of the phase-A of the deicing bus is connected with one side of the phase-A of the deicing AC line, the other end of the phase-B of the deicing bus is connected with one side of the phase-B of the deicing AC line, the other end of the phase-C of the deicing bus is connected with one side of the phase-C of the deicing AC line; and the other ends of the phase-A, the phase-B and the phase-C of the deicing AC line are connected together.

Preferably, there is no grounding point at a DC side of the DC deicer.

Preferably, the modular multilevel voltage source converter comprises a 3-phase 6-bridge-arm structure having three phases each having an upper bridge arm and a lower bridge arm; the connecting reactor comprises three phases each corresponding to one of the three phases of the structure; each bridge arm comprises one reactor and a plurality of full H-bridge submodules connected in series, one end of the reactor being connected to one end of the plurality of full H-bridge submodules connected in series; the other ends of reactors in upper and lower bridge arms of each phase of the structure and the corresponding phase of the connecting reactor are connected to one another; and the other ends of the plurality of full H-bridge submodules in three upper bridge arms of the three phases of the structure are connected together to form a DC-side positive pole of the structure, and the other ends of the plurality of full H-bridge submodules in three lower bridge arms of the three phases of the structure are connected together to form a DC-side negative pole of the structure.

The full H-bridge submodule of the converter is a full H-bridge submodule with a plurality of fully-controlled power electronic devices, or a full H-bridge submodule with a plurality of fully-controlled power electronic device sets.

In a first embodiment of the present invention, the full H-bridge submodule of the converter is a full H-bridge submodule with a plurality of fully-controlled power electronic devices, which comprises: first, second, third and fourth fully-controlled power electronic device pairs each having a fully-controlled power electronic device and a diode in inverse-parallel connection, a positive end of the fully-controlled power electronic device and a negative end of the diode being connected together to form a positive end of each of the fully-controlled power electronic device pairs, and a negative end of the fully-controlled power electronic device and a positive end of the diode being connected together to form a negative end of each of the fully-controlled power electronic device pairs; a capacitor; a thyristor pair having two thyristors in inverse-parallel connection; and a fast switch. The negative end of the first fully-controlled power electronic device pair is connected with the positive end of the second fully-controlled power electronic device pair to form one end of the full H-bridge submodule; the negative end of the third fully-controlled power electronic device pair is connected with the positive end of the fourth fully-controlled power electronic device pair to form the other end of the full H-bridge submodule; the positive ends of the first and third fully-controlled power electronic device pairs are connected with one end of the capacitor, and the negative ends of the second and fourth fully-controlled power electronic device pairs are connected with the other end of the capacitor; the fast switch is connected with two ends of the full H-bridge submodule; and the thyristor pair is connected with two ends of the full H-bridge submodule.

In a second embodiment of the present invention, the full H-bridge submodule of the converter is a full H-bridge submodule with a plurality of fully-controlled power electronic device sets, which comprises: first, second, third and fourth fully-controlled power electronic device sets each having two fully-controlled power electronic device pairs each having a fully-controlled power electronic device and a diode in inverse-parallel connection, a positive end of the fully-controlled power electronic device and a negative end of the diode being connected together to form a positive end of each of the fully-controlled power electronic device pairs, a negative end of the fully-controlled power electronic device and a positive end of the diode being connected together to form a negative end of each of the fully-controlled power electronic device pairs, positive ends of the two fully-controlled power electronic device pairs in each of the fully-controlled power electronic device sets being connected together to form a positive end of each of the fully-controlled power electronic device sets and negative ends of the two fully-controlled power electronic device pairs in each of the fully-controlled power electronic device sets being connected together to form a negative end of each of the fully-controlled power electronic device sets; a capacitor; a thyristor pair having two thyristors in inverse-parallel connection; and a fast switch. The negative end of the first fully-controlled power electronic device set is connected with the positive end of the second fully-controlled power electronic device set to form one end of the full H-bridge submodule; the negative end of the third fully-controlled power electronic device set is connected with the positive end of the fourth fully-controlled power electronic device set to form the other end of the full H-bridge submodule; the positive ends of the first and third fully-controlled power electronic device sets are connected with one end of the capacitor, and the negative ends of the second and fourth fully-controlled power electronic device sets are connected with the other end of the capacitor; the fast switch is connected with two ends of the full H-bridge submodule; and the thyristor pair is connected with two ends of the full H-bridge submodule.

In a third embodiment of the present invention, the full H-bridge submodule of the converter is a full H-bridge submodule with a plurality of fully-controlled power electronic device sets, which comprises: first, second, third and fourth fully-controlled power electronic device sets each having three fully-controlled power electronic device pairs each having a fully-controlled power electronic device and a diode in inverse-parallel connection, a positive end of the fully-controlled power electronic device and a negative end of the diode being connected together to form a positive end of each of the fully-controlled power electronic device pairs, a negative end of the fully-controlled power electronic device and a positive end of the diode being connected together to form a negative end of each of the fully-controlled power electronic device pairs, positive ends of the three fully-controlled power electronic device pairs in each of the fully-controlled power electronic device sets being connected together to form a positive end of each of the fully-controlled power electronic device sets and negative ends of the three fully-controlled power electronic device pairs in each of the fully-controlled power electronic device sets being connected together to form a negative end of each of the fully-controlled power electronic device sets; a capacitor; a thyristor pair having two thyristors in inverse-parallel connection; and a fast switch. The negative end of the first fully-controlled power electronic device set is connected with the positive end of the second fully-controlled power electronic device set to form one end of the full H-bridge submodule; the negative end of the third fully-controlled power electronic device set is connected with the positive end of the fourth fully-controlled power electronic device set to form the other end of the full H-bridge submodule; the positive ends of the first and third fully-controlled power electronic device sets are connected with one end of the capacitor, and the negative ends of the second and fourth fully-controlled power electronic device sets are connected with the other end of the capacitor; the fast switch is connected with two ends of the full H-bridge submodule; and the thyristor pair is connected with two ends of the full H-bridge submodule.

In a fourth embodiment of the present invention, the full H-bridge submodule of the converter is a full H-bridge submodule with a plurality of fully-controlled power electronic device sets, which comprises: first, second, third and fourth fully-controlled power electronic device sets each having a plurality of fully-controlled power electronic device pairs each having a fully-controlled power electronic device and a diode in inverse-parallel connection, a positive end of the fully-controlled power electronic device and a negative end of the diode being connected together to form a positive end of each of the fully-controlled power electronic device pairs, a negative end of the fully-controlled power electronic device and a positive end of the diode being connected together to form a negative end of each of the fully-controlled power electronic device pairs, positive ends of the plurality of fully-controlled power electronic device pairs in each of the fully-controlled power electronic device sets being connected together to form a positive end of each of the fully-controlled power electronic device sets, and negative ends of the plurality of fully-controlled power electronic device pairs in each of the fully-controlled power electronic device sets being connected together to form a negative end of each of the fully-controlled power electronic device sets; a capacitor; a thyristor pair having two thyristors in inverse-parallel connection; and a fast switch. The negative end of the first fully-controlled power electronic device set is connected with the positive end of the second fully-controlled power electronic device set to form one end of the full H-bridge submodule; the negative end of the third fully-controlled power electronic device set is connected with the positive end of the fourth fully-controlled power electronic device set to form the other end of the full H-bridge submodule; the positive ends of the first and third fully-controlled power electronic device sets are connected with one end of the capacitor, and the negative ends of the second and fourth fully-controlled power electronic device sets are connected with the other end of the capacitor; the fast switch is connected with two ends of the full H-bridge submodule; and the thyristor pair is connected with two ends of the full H-bridge submodule.

In another embodiment of the present invention, a method for controlling the voltage source converter based DC deicer comprises the steps of:

(a) calculating $U_{dc\text{-}ref}$, a reference value of an output voltage at the DC side of the converter, based on a designed deicing current $I_{deicing}$ and a DC-side DC loop resistance $R_{loop}$ in the deicing AC line by an equation $$U_{dc\text{-}ref} = I_{deicing} R_{loop};$$

(b) determining $N_{minus}$, the number of a submodule to be deducted from the upper and lower bridge arms of each phase, based on the reference value by an equation $$\begin{cases} N_{minus} = \text{Round}\left[\dfrac{U_{dc\text{-}rated} - U_{dc\text{-}ref}}{V_{dc}}\right], \\ U_{dc\text{-}rated} = N_{max} V_{dc} \end{cases}$$

wherein $V_{dc}$ is a rated voltage of the full H-bridge submodule, $N_{max}$ is the number of the full H-bridge submodule in a single bridge arm, and $V_{dc\text{-}rated}$ is a rated DC voltage of the converter;

(c) determining $N_{plus}$, the number of a submodule to be added to the upper and lower bridge arms of each phase by an equation $$N_{plus} = N_{max} - N_{minus};$$

(d) determining a level number of the converter under a working condition by an equation $$N_{level} = \text{Round}\left[\dfrac{U_{dc\text{-}ref}}{V_{dc}}\right] + 2N_{minus} + 1;$$

wherein a voltage range of the upper bridge arm $U_{dc\text{-}up}$ is $[-N_{minus}V_{DC}, N_{max}V_{DC}]$, and a voltage range of the lower bridge arm $U_{dc\text{-}down}$, is $[N_{max}V_{DC}, -N_{minus}V_{DC}]$; and (e) adding 1 to the number of the submodule to be deducted $N_{minus}$ and accordingly deducting 1 from the number of the submodule to be added $N_{plus}$ if a deicing current in a deicing loop is smaller than the designed deicing current $I_{deicing}$; or deducting 1 from the number of submodule to be deducted $N_{minus}$ and accordingly adding 1 to the number of the submodule to be added $N_{plus}$ if the deicing current in the deicing loop is larger than the designed deicing current $I_{deicing}$.

The voltage source converter based DC deicer of the present invention takes advantage of the feature of the full H-bridge submodule that can output three types of voltage, including positive voltage, zero voltage and negative voltage, so that both the voltage and current at the DC side of the DC converter are continuously adjustable between zero and a rated value. Hence the voltage source converter based DC deicer of the present invention satisfies the need of deicing power transmission lines of different length and resistivity, satisfies the need of the deicing of power transmission lines of 10 kV, 110 kV, 220 kV, 500 kV and ultra-high voltages, meets the requirements for boosting the current and voltage up from zero at the DC side, and ensures the quality of AC side of the DC deicer under all operating conditions while having little impact on the AC system which is connected with DC deicer. The voltage source converter based DC deicer of the present invention is reasonably designed, convenient and practical. The voltage source converter based DC deicer of the present invention can be used both in newly-built DC deicing project and in the reconstruction of existing DC deicers, which has a prospect of wide application.

DETAILED DESCRIPTION OF ILLUSTRATED EMBODIMENTS

The present invention will be further explained below in detail with reference to figures and particular embodiments.

Embodiment 1

Figure 1:
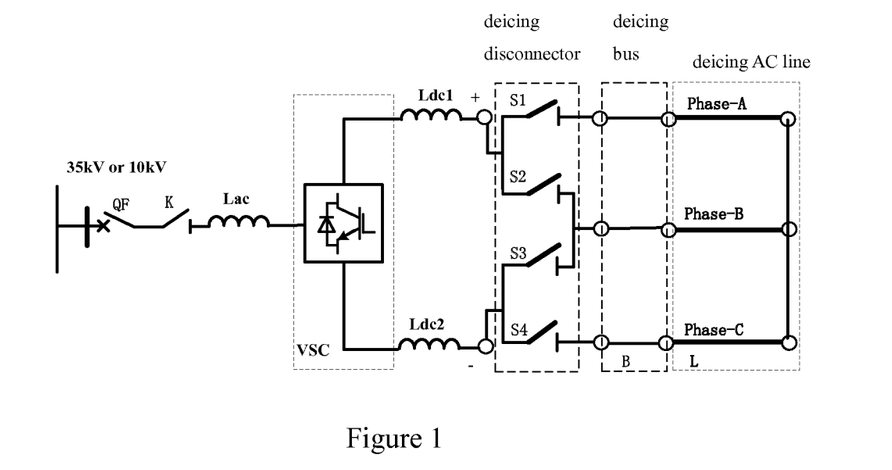
FIG. 1 is a schematic illustration of a voltage source converter based direct current (DC) deicer of the present invention.

Referring to FIG. 1, this embodiment provides a voltage source converter based direct current (DC) deicer, comprising: a connecting reactor Lac; a modular multilevel voltage source converter VSC based on a full H-bridge submodule and having an alternating current (AC) side and a DC side; first and second smoothing reactors Ldc1, Ldc2; first, second, third and fourth deicing disconnectors S1, S2, S3, S4; a deicing bus B having a phase-A, a phase-B and a phase-C; and a deicing AC line L having a phase-A, a phase-B and a phase-C. One end of the connecting reactor Lac is connected to an AC side bus through an isolation disconnector K and a breaker QF connected in series, and the other end of the connecting reactor Lac is connected to the AC side of the converter VSC. The DC side of the converter VSC is connected to one end of each of the first and second smoothing reactors Ldc1, Ldc2. The other end of the first smoothing reactor Ldc1, one end of the first deicing disconnector S1 and one end of the second deicing disconnector S2 are connected to one another. The other end of the second smoothing reactor Ldc2, one end of the third deicing disconnector S3 and one end of the fourth deicing disconnector S4 are connected to one another. The other end of the first deicing disconnector S1 is connected with one end of the phase-A of the deicing bus B. The other end of the second deicing disconnector S2, the other end of the third deicing disconnector S3 and one end of the phase-B of the deicing bus B are connected to one another. The other end of the fourth deicing disconnector S4 is connected with one end of phase-C of the deicing bus B. The other end of the phase-A of the deicing bus B is connected with one side of the phase-A of the deicing AC line L, the other end of the phase-B of the deicing bus B is connected with one side of the phase-B of the deicing AC line L, the other end of the phase-C of the deicing bus B is connected with one side of the phase-C of the deicing AC line L; and the other ends of the phase-A, the phase-B and the phase-C of the deicing AC line L are connected together.

There is no grounding point at a DC side of the DC deicer.

Figure 2:
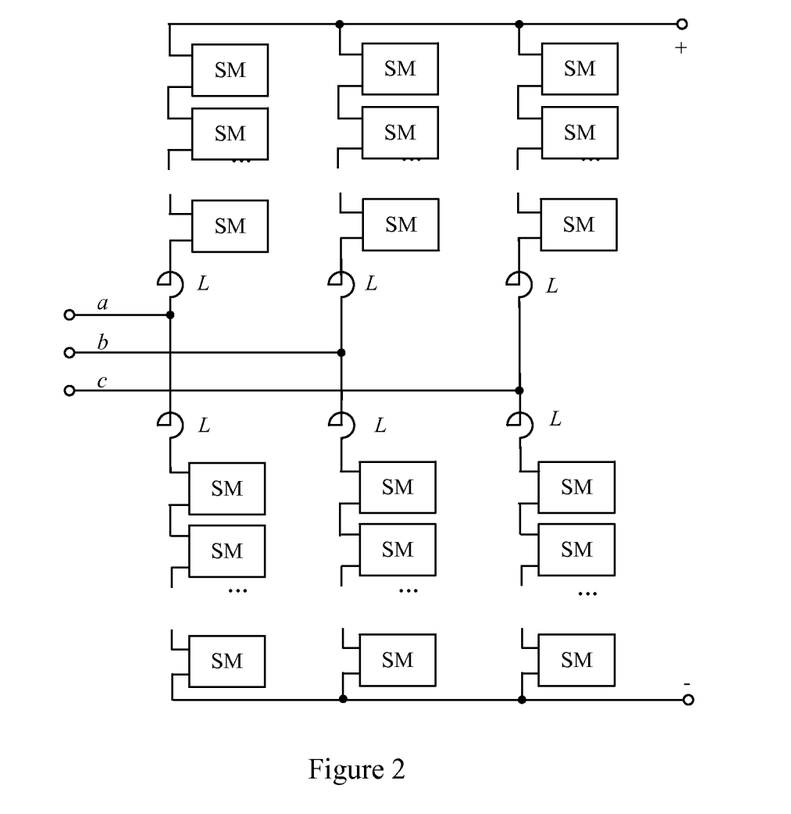
FIG. 2 is a schematic illustration of a modular multilevel voltage source converter based on a full H-bridge submodule of the present invention.

Referring to FIG. 2, the modular multilevel voltage source converter VSC comprises a 3-phase 6-bridge-arm structure having three phases each having an upper bridge arm and a lower bridge arm. The connecting reactor Lac comprises three phases each corresponding to one of the three phases of the structure. Each bridge arm comprises one reactor L and a plurality of full H-bridge submodules SM connected in series, one end of the reactor L being connected to one end of the plurality of full H-bridge submodules SM connected in series. The other ends of reactors L in upper and lower bridge arms of each phase of the structure and the corresponding phase of the connecting reactor Lac are connected to one another. The other ends of the plurality of full H-bridge submodules SM in three upper bridge arms of the three phases of the structure are connected together to form a DC-side positive pole of the structure, and the other ends of the plurality of full H-bridge submodules SM in three lower bridge arms of the three phases of the structure are connected together to form a DC-side negative pole of the structure.

In this embodiment, the full H-bridge submodule of the converter VSC is a full H-bridge submodule with a plurality of fully-controlled power electronic devices.

Figure 3:
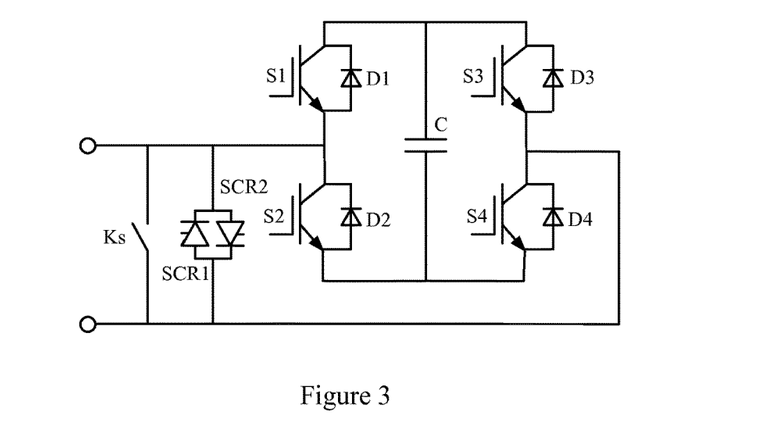
FIG. 3 is a schematic illustration of a full H-bridge submodule with a plurality of fully-controlled power electronic devices according to a first embodiment of the present invention.

Referring to FIG. 3, the full H-bridge submodule with a plurality of fully-controlled power electronic devices comprises: first, second, third and fourth fully-controlled power electronic device pairs each having a fully-controlled power electronic device and a diode in inverse-parallel connection (see FIG. 3, a fully-controlled power electronic device S1 and a diode D1 being in inverse-parallel connection, a fully-controlled power electronic device S2 and a diode D2 being in inverse-parallel connection, a fully-controlled power electronic device S3 and a diode D3 being in inverse-parallel connection, and a fully-controlled power electronic device S4 and a diode D4 being in inverse-parallel connection), a positive end of the fully-controlled power electronic device and a negative end of the diode being connected together to form a positive end of each of the fully-controlled power electronic device pairs, and a negative end of the fully-controlled power electronic device and a positive end of the diode being connected together to form a negative end of each of the fully-controlled power electronic device pairs; a capacitor C; a thyristor pair having two thyristors SCR1, SCR2 in inverse-parallel connection; and a fast switch Ks. The negative end of the first fully-controlled power electronic device pair is connected with the positive end of the second fully-controlled power electronic device pair to form one end of the full H-bridge submodule. The negative end of the third fully-controlled power electronic device pair is connected with the positive end of the fourth fully-controlled power electronic device pair to form the other end of the full H-bridge submodule. The positive ends of the first and third fully-controlled power electronic device pairs are connected with one end of the capacitor C, and the negative ends of the second and fourth fully-controlled power electronic device pairs are connected with the other end of the capacitor C. The fast switch Ks is connected with two ends of the full H-bridge submodule; and the thyristor pair is connected with two ends of the full H-bridge submodule.

A method for controlling the voltage source converter based DC deicer of the present invention comprises the steps of:

(a) calculating $U_{dc\cdot ref}$, a reference value of an output voltage at the DC side of the converter, based on a designed deicing current $I_{deicing}$ and a DC-side DC loop resistance $R_{loop}$ in the deicing AC line by an equation $$U_{dc\cdot ref} = I_{deicing} R_{loop};$$

(b) determining $N_{minus}$, the number of a submodule to be deducted from the upper and lower bridge arms of each phase, based on the reference value by an equation $$\begin{cases} N_{minus} = \text{Round}\left[\dfrac{U_{dc\cdot rated} - U_{dc\cdot ref}}{V_{dc}}\right], \\ U_{dc\cdot rated} = N_{max} V_{dc} \end{cases}$$

wherein $V_{dc}$ is a rated voltage of the full H-bridge submodule, $N_{max}$ is the number of the full H-bridge submodule in a single bridge arm, and $U_{dc\cdot rated}$ is a rated DC voltage of the converter;

(c) determining $N_{plus}$, the number of a submodule to be added to the upper and lower bridge arms of each phase by an equation $$N_{plus} = N_{max} - N_{minus};$$

(d) determining a level number of the converter under a working condition by an equation $$N_{level} = \text{Round}\left[\dfrac{U_{dc\cdot ref}}{V_{dc}}\right] + 2N_{minus} + 1;$$

wherein a voltage range of the upper bridge arm $U_{dc\cdot up}$ is $[N_{minus} V_{DC}, N_{max} V_{DC}]$, and a voltage range of the lower bridge arm $U_{dc\cdot down}$ is $[N_{max} V_{DC}, -N_{minus} V_{DC}]$; and (e) adding 1 to the number of the submodule to be deducted $N_{minus}$ and accordingly deducting 1 from the number of the submodule to be added $N_{minus}$ if a deicing current in a deicing loop is smaller than the designed deicing current $I_{deicing}$ or deducting 1 from the number of submodule to be deducted $N_{minus}$ and accordingly adding 1 to the number of the submodule to be added $N_{plus}$ if the deicing current in the deicing loop is larger than the designed deicing current $I_{deicing}$.

Embodiment 2

In this embodiment, the full H-bridge submodule of the converter VSC is a full H-bridge submodule with a plurality of fully-controlled power electronic device sets.

Figure 4:
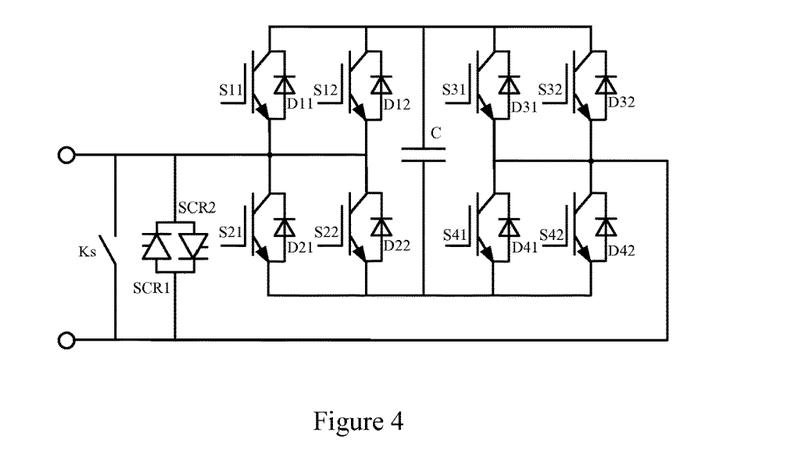
FIG. 4 is a schematic illustration of a full H-bridge submodule with a plurality of fully-controlled power electronic device sets according to a second embodiment of the present invention.

Referring to FIG. 4, the full H-bridge submodule with a plurality of fully-controlled power electronic device sets comprises: first, second, third and fourth fully-controlled power electronic device sets each having two fully-controlled power electronic device pairs each having a fully-controlled power electronic device and a diode in inverse-parallel connection (see FIG. 4, a fully-controlled power electronic device S11 and a diode D11 being in inverse-parallel connection, a fully-controlled power electronic device S12 and a diode D12 being in inverse-parallel connection, a fully-controlled power electronic device S21 and a diode D21 being in inverse-parallel connection, a fully-controlled power electronic device S22 and a diode D22 being in inverse-parallel connection, a fully-controlled power electronic device S31 and a diode D31 being in inverse-parallel connection, a fully-controlled power electronic device S32 and a diode D32 being in inverse-parallel connection, a fully-controlled power electronic device S41 and a diode D41 being in inverse-parallel connection, a fully-controlled power electronic device S42 and a diode D42 being in inverse-parallel connection), a positive end of the fully-controlled power electronic device and a negative end of the diode being connected together to form a positive end of each of the fully-controlled power electronic device pairs, a negative end of the fully-controlled power electronic device and a positive end of the diode being connected together to form a negative end of each of the fully-controlled power electronic device pairs, positive ends of the two fully-controlled power electronic device pairs in each of the fully-controlled power electronic device sets being connected together to form a positive end of each of the fully-controlled power electronic device sets and negative ends of the two fully-controlled power electronic device pairs in each of the fully-controlled power electronic device sets being connected together to form a negative end of each of the fully-controlled power electronic device sets; a capacitor C; a thyristor pair having two thyristors SCR1, SCR2 in inverse-parallel connection; and a fast switch Ks. The negative end of the first fully-controlled power electronic device set is connected with the positive end of the second fully-controlled power electronic device set to form one end of the full H-bridge submodule. The negative end of the third fully-controlled power electronic device set is connected with the positive end of the fourth fully-controlled power electronic device set to form the other end of the full H-bridge submodule. The positive ends of the first and third fully-controlled power electronic device sets are connected with one end of the capacitor C, and the negative ends of the second and fourth fully-controlled power electronic device sets are connected with the other end of the capacitor C. The fast switch Ks is connected with two ends of the full H-bridge submodule; and the thyristor pair is connected with two ends of the full H-bridge submodule.

Embodiment 3

In this embodiment, the full H-bridge submodule of the converter VSC is a full H-bridge submodule with a plurality of fully-controlled power electronic device sets.

The full H-bridge submodule with a plurality of fully-controlled power electronic device sets comprises: first, second, third and fourth fully-controlled power electronic device sets each having three fully-controlled power electronic device pairs each having a fully-controlled power electronic device and a diode in inverse-parallel connection, a positive end of the fully-controlled power electronic device and a negative end of the diode being connected together to form a positive end of each of the fully-controlled power electronic device pairs, a negative end of the fully-controlled power electronic device and a positive end of the diode being connected together to form a negative end of each of the fully-controlled power electronic device pairs, positive ends of the three fully-controlled power electronic device pairs in each of the fully-controlled power electronic device sets being connected together to form a positive end of each of the fully-controlled power electronic device sets, and negative ends of the three fully-controlled power electronic device pairs in each of the fully-controlled power electronic device sets being connected together to form a negative end of each of the fully-controlled power electronic device sets; a capacitor C; a thyristor pair having two thyristors SCR1, SCR2 in inverse-parallel connection; and a fast switch Ks. The negative end of the first fully-controlled power electronic device set is connected with the positive end of the second fully-controlled power electronic device set to form one end of the full H-bridge submodule. The negative end of the third fully-controlled power electronic device set is connected with the positive end of the fourth fully-controlled power electronic device set to form the other end of the full H-bridge submodule. The positive ends of the first and third fully-controlled power electronic device sets are connected with one end of the capacitor C, and the negative ends of the second and fourth fully-controlled power electronic device sets are connected with the other end of the capacitor C. The fast switch Ks is connected with two ends of the full H-bridge submodule; and the thyristor pair is connected with two ends of the full H-bridge submodule.

Embodiment 4

In this embodiment, the full H-bridge submodule of the converter VSC is a full H-bridge submodule with a plurality of fully-controlled power electronic device sets.

Figure 5:
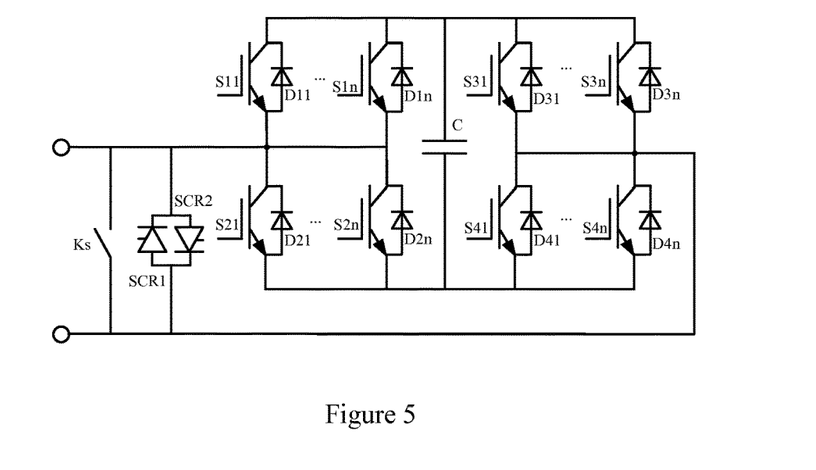
FIG. 5 is a schematic illustration of a full H-bridge submodule with a plurality of fully-controlled power electronic device sets according to a fourth embodiment of the present invention.

Referring to FIG. 5, the full H-bridge submodule with a plurality of fully-controlled power electronic device sets comprises: first, second, third and fourth fully-controlled power electronic device sets each having a plurality of fully-controlled power electronic device pairs each having a fully-controlled power electronic device and a diode in inverse-parallel connection, a positive end of the fully-controlled power electronic device and a negative end of the diode being connected together to form a positive end of each of the fully-controlled power electronic device pairs, a negative end of the fully-controlled power electronic device and a positive end of the diode being connected together to form a negative end of each of the fully-controlled power electronic device pairs, positive ends of the plurality of fully-controlled power electronic device pairs in each of the fully-controlled power electronic device sets being connected together to form a positive end of each of the fully-controlled power electronic device sets, and negative ends of the plurality of fully-controlled power electronic device pairs in each of the fully-controlled power electronic device sets being connected together to form a negative end of each of the fully-controlled power electronic device sets; a capacitor C; a thyristor pair having two thyristors SCR1, SCR2 in inverse-parallel connection; and a fast switch Ks. The negative end of the first fully-controlled power electronic device set is connected with the positive end of the second fully-controlled power electronic device set to form one end of the full H-bridge submodule. The negative end of the third fully-controlled power electronic device set is connected with the positive end of the fourth fully-controlled power electronic device set to form the other end of the full H-bridge submodule. The positive ends of the first and third fully-controlled power electronic device sets are connected with one end of the capacitor C, and the negative ends of the second and fourth fully-controlled power electronic device sets are connected with the other end of the capacitor C. The fast switch Ks is connected with two ends of the full H-bridge submodule; and the thyristor pair is connected with two ends of the full H-bridge submodule.

What is claimed is:

1. A voltage source converter based direct current (DC) deicer, comprising:
   a connecting reactor;
   a modular multilevel voltage source converter having an alternating current (AC) side and a DC side; the modular multilevel voltage source converter comprising a 3-phase 6-bridge-arm structure having three phases each having an upper bridge arm and a lower bridge arm;
   first and second smoothing reactors;
   first, second, third and fourth deicing disconnectors;
   a deicing bus having a phase-A, a phase-B and a phase-C; and
   a deicing AC line having a phase-A, a phase-B and a phase-C;
   wherein one end of the connecting reactor is connected to an AC side bus through an isolation disconnector and a breaker connected in series, and an other end of the connecting reactor is connected to the AC side of the converter;
   the DC side of the converter is connected to one end of each of the first and second smoothing reactors;
   an other end of the first smoothing reactor, one end of the first deicing disconnector and one end of the second deicing disconnector are connected to one another;
   the other end of the second smoothing reactor, one end of the third deicing disconnector and one end of the fourth deicing disconnector are connected to one another;
   an other end of the first deicing disconnector is connected with one end of the phase-A of the deicing bus;
   an other end of the second deicing disconnector, an other end of the third deicing disconnector and one end of the phase-B of the deicing bus are connected to one another;
   an other end of the fourth deicing disconnector is connected with one end of phase-C of the deicing bus;
   an other end of the phase-A of the deicing bus is connected with one side of the phase-A of the deicing AC line, an other end of the phase-B of the deicing bus is connected with one side of the phase-B of the deicing AC line, an other end of the phase-C of the deicing bus is connected with one side of the phase-C of the deicing AC line; and
   the other end of the phase-A of the deicing AC line, the other end of the phase-B of the deicing AC line and the other end of the phase-C of the deicing AC line are connected together;
   the connecting reactor comprises three phases each corresponding to one of the three phases of the structure;
   each bridge arm comprises one reactor and a plurality of full H-bridge submodules connected in series, one end of the reactor being connected to one end of the plurality of full H-bridge submodules connected in series;
   other ends of reactors in upper and lower bridge arms of each phase of the structure and the corresponding phase of the connecting reactor are connected to one another; and
   the other ends of the plurality of full H-bridge submodules in three upper bridge arms of the three phases of the structure are connected together to form a DC-side positive pole of the structure, and the other ends of the plurality of full H-bridge submodules in three lower bridge arms of the three phases of the structure are connected together to form a DC-side negative pole of the structure;
   the full H-bridge submodule comprises a plurality of fully-controlled power electronic device sets;
   the plurality of fully-controlled power electronic device sets comprises:
   a first fully-controlled power electronic device set, a second fully-controlled power electronic device set, a third fully-controlled power electronic device set and a fourth fully-controlled power electronic device set each having a plurality of fully-controlled power electronic device pairs each having a fully-controlled power electronic device and a diode in inverse-parallel connection,
   a positive end of the fully-controlled power electronic device and a negative end of the diode being connected together to form a positive end of each of the fully-controlled power electronic device pairs,
   a negative end of the fully-controlled power electronic device and a positive end of the diode being connected together to form a negative end of each of the fully-controlled power electronic device pairs,
   the positive end of each of the plurality of fully-controlled power electronic device pairs in each of the fully-controlled power electronic device sets being connected with one another to form a positive end of each of the first fully-controlled power electronic device set, the second fully-controlled power electronic device set, the third fully-controlled power electronic device set and the fourth fully-controlled power electronic device set; and
   the negative end of each of the plurality of fully-controlled power electronic device pairs in each of the fully-controlled power electronic device sets being connected with one another to form a negative end of each of the first fully-controlled power electronic device set, the second fully-controlled power electronic device set, the third fully-controlled power electronic device set and the fourth fully-controlled power electronic device set;
   a capacitor;
   a thyristor pair having two thyristors in inverse-parallel connection;
   a fast switch;
   the negative end of the first fully-controlled power electronic device set is connected with the positive end of the second fully-controlled power electronic device set to form one end of the full H-bridge submodule;
   the negative end of the third fully-controlled power electronic device set is connected with the positive end of the fourth fully-controlled power electronic device set to form an other end of the full H-bridge submodule;
   the positive end of the first fully-controlled power electronic device set and the positive end of the third fully-controlled power electronic device set are connected with one end of the capacitor, and
   the negative end of the second fully-controlled power electronic device set and the negative end of the fourth fully-controlled power electronic device set are connected with an other end of the capacitor;
   one end of the fast switch is connected with the negative end of the first fully-controlled power electronic device set and the positive end of the second fully-controlled power electronic device set, an other end of the fast switch is connected with the negative end of the third fully-controlled power electronic device set and the positive end of the fourth fully-controlled power electronic device set; one end of the thyristor pair is connected with the negative end of the first fully-controlled power electronic device set and the positive end of the second fully-controlled power electronic device set, an other end of the thyristor pair is connected with the negative end of the third fully-controlled power electronic device set and the positive end of the fourth fully-controlled power electronic device set.

2. The voltage source converter based DC deicer according to claim 1, wherein there is no grounding point at a DC side of the DC deicer.

* * * * *